US012170005B2

(12) United States Patent
Srinivasan et al.

(10) Patent No.: US 12,170,005 B2
(45) **Date of Patent: *Dec. 17, 2024**

(54) PROCESSING SECURITY-RELATED MESSAGES

(71) Applicant: Comcast Cable Communications, LLC, Philadelphia, PA (US)

(72) Inventors: Thiru Srinivasan, Highlands Ranch, CO (US); William Lesage, Englewood, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 158 days.

This patent is subject to a terminal disclaimer.

(21) Appl. No.: 15/633,153

(22) Filed: Jun. 26, 2017

(65) Prior Publication Data

US 2018/0137724 A1 May 17, 2018

Related U.S. Application Data

(63) Continuation of application No. 13/785,313, filed on Mar. 5, 2013, now Pat. No. 9,721,443.

(51) Int. Cl.
*G08B 13/00* (2006.01)
*G08B 27/00* (2006.01)

(52) U.S. Cl.
CPC ............. *G08B 13/00* (2013.01); *G08B 27/00* (2013.01)

(58) Field of Classification Search
CPC ......... G08B 13/00; G08B 27/00; G01S 15/04; G01S 15/87; G01S 7/539; G01S 13/04; G01S 15/88; B60N 2/002; B60N 2002/0268; B60N 2002/0272; B60R 21/01516; B60R 21/0152; B60R 2001/1223; G06K 9/00624; G06K 9/00832
See application file for complete search history.

(56) References Cited

U.S. PATENT DOCUMENTS

| | | | | |
|---|---|---|---|---|
| 6,014,080 | A * | 1/2000 | Layson, Jr. | G08B 21/0211 340/539.1 |
| 2003/0218541 | A1 * | 11/2003 | Sakai | G08B 13/08 340/545.1 |
| 2004/0086089 | A1 | 5/2004 | Naidoo et al. | |
| 2006/0061478 | A1 | 3/2006 | Kim | |
| 2007/0159354 | A1 * | 7/2007 | Rosenberg | G08G 1/0965 340/902 |
| 2008/0109887 | A1 | 5/2008 | Chen et al. | |
| 2010/0124900 | A1 * | 5/2010 | Lui | H04M 1/72424 455/404.2 |
| 2011/0018736 | A1 * | 1/2011 | Carr | G08G 1/0965 340/902 |
| 2012/0028600 | A1 * | 2/2012 | Vallaire | G08B 27/00 455/404.2 |
| 2014/0203943 | A1 | 7/2014 | Kates | |

* cited by examiner

*Primary Examiner* — Brian A Zimmerman
*Assistant Examiner* — Cal J Eustaquio
(74) *Attorney, Agent, or Firm* — Banner & Witcoff, Ltd.

(57) ABSTRACT

Methods and systems for processing messages received from a security device are presented. In some embodiments, a server may receive one or more messages from a security console and subsequently may determine the location of the security console. The server then may identify one or more other devices that are grouped, e.g., located within a predetermined distance, with the security console. Thereafter, the server may send one or more alert messages to the identified devices.

22 Claims, 6 Drawing Sheets

PROCESSING SECURITY-RELATED MESSAGES

CROSS-REFERENCE TO RELATED APPLICATIONS

The application is a continuation of U.S. application Ser. No. 13/785,313 entitled "PROCESSING SECURITY-RELATED MESSAGES" and filed on Mar. 5, 2013. The content of the prior application is incorporated herein by reference in their entirety.

BACKGROUND

Aspects of the disclosure relate to systems and methods that may be used with or implemented by or in furtherance of home security systems. In particular, various aspects of the disclosure relate to processing messages received from a security console of a home security system.

Home security systems are becoming increasingly popular among consumers and can be found in a growing number of houses, apartments, offices, and other premises. In addition, users of such systems are increasingly able to customize various aspects of these security systems to suit their particular needs at their particular installation location.

One way the user can customize such a security system is by choosing whether to have their system be monitored or unmonitored. A "monitored" security system may, for instance, be a security system that is connected to a central monitoring service (e.g., via one or more networks and servers). Such a central monitoring service can continuously check the status of the alarm system and its various sensors, for example, and determine whether to dispatch, police, fire, ambulance, or other emergency responders in cases where the alarm is tripped or other alert circumstances arise. An "unmonitored" security system, by contrast, might not be connected to such a central monitoring service, and instead might simply include one or more audio sirens, strobe lights, and/or the like, which can be used in initiating audible and/or visible alerts in cases where the alarm is tripped.

Regardless of the specific features and configuration that may be used with a particular security system at a particular location, however, there remains a need to provide increased performance, functionality, and convenience to users of security systems.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some examples and concepts of the disclosure in a simplified form as a prelude to the description below.

Despite the differences in sensors, configuration settings, and hardware and software components that may exist between different security systems, many typical security systems will include similar, if not the same, hardware and software regardless of whether the security system happens to be monitored or unmonitored. This may, for instance, allow a user to decide whether their security system should be monitored or unmonitored, and may further provide flexibility to the user by allowing the user to switch the system between these states (e.g., from being monitored to unmonitored, or vice versa).

While some users may choose to have their security system be unmonitored (e.g., in order to avoid incurring the charges and fees associated with having a monitored security system), these users may still wish to have some of the benefits that come with having a monitored security system. In addition, despite the fact that a particular security system may be operating in an unmonitored state, the security system may nevertheless send messages, such as heartbeat messages, also known as keep-alive messages or pings, to a central office and/or one or more backend servers or data storage facilities.

Certain embodiments discussed herein utilize heartbeat messages to provide enhanced functionality to users of both monitored and unmonitored alarm systems. For example, in some embodiments discussed in greater detail below, a security system may insert additional data into its heartbeat messages, which can be received and processed by a computing device, such as a backend server, to generate and send alert messages to other devices and users. In some instances, this may result in alert messages being sent to groups, such as neighbors and/or other entities that may be located at or near the premises where the security system is installed.

In one or more embodiments described herein, a computing device (e.g., a server) may receive one or more messages from a security console, such as a home security console. Such a security console may, for example, be part of a home security system and may include and/or function as a control panel, central computing device, and/or network gateway at a premises where the home security system is installed. For instance, the security console can monitor and analyze detection results and/or other signals received from various sensors installed at the premises, activate alerts and/or alarms (e.g., based on analyzing such detection results and/or other signals), provide various user interfaces and/or otherwise enable a user to configure various aspects of the home security system, and/or provide other functions.

In various embodiments, after the monitoring device (e.g., the server) receives the one or more messages from a transmitting element in a security console, the server may determine the location of the security console. The server then may identify one or more other devices that are located near the security console (e.g., located within a predetermined distance of the location of the security console, located within a predetermined services boundary, such as a police services boundary or an emergency medical services boundary (or any other type of emergency services boundaries), of the security console, etc.). Thereafter, the server may send one or more alert messages to the identified devices, based on the one or more messages received from the security console.

In some additional and/or alternative embodiments, one or more messages received from a security console, such as a home security console, may comprise heartbeat-type messages. In some instances, the heartbeat messages can include additional data that causes or identifies reasons for the one or more alert messages to be sent. Additionally or alternatively, the additional data may identify or specify content to be included in the one or more alert messages.

In some embodiments, determining the location of the particular security console may include extracting geolocation information from the one or more messages received from the security console. In some additional and/or alternative embodiments, identifying the one or more other devices that are located within a predetermined distance of the location of the security console may include identifying at least one additional home security console that is located within a predetermined radius of the security console. In still other embodiments, identifying the one or more other devices that are located within a predetermined distance of the location of the security console may include identifying at least one mobile device that is connected to a cellular base station from which the security console also receives wireless signals. In yet other embodiments, identifying the one or more other devices that are located within a predetermined distance of the location of the security console may include communicating with application software resident on at least one of these other devices (e.g., an "app" installed on a mobile device, such as a smart phone, tablet computer, etc.), where such software is configured to respond (e.g., to the server computer) with one or more messages specifying the current location of the device(s) on which the software is installed and/or being executed.

In some embodiments, at least one alert message of the one or more alert messages may be sent to a first device of the one or more other devices in response to a heartbeat message received by the server from the first device. In some instances, the first device is a mobile computing device that is configured to emulate a security console, such as a home security console.

In some additional and/or alternative embodiments, the security console may be integrated into a gateway device that is configured to be connected to a hybrid fiber-coaxial (HFC) network, a fiber optic network, a wireless network, or a combination thereof.

BRIEF DESCRIPTION OF THE DRAWINGS

Aspects of the disclosure are illustrated by way of example with respect to the accompanying figures, in which like reference numerals indicate similar elements, and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As discussed above, various aspects of the disclosure relate to processing messages received from a security console, such as a home security console. In several of the examples that are discussed below, the ways in which one or more central server computers can process these messages, as well as the processing that may be performed by a security console, such as a home security console, in generating and sending these messages, will be illustrated. Before turning to these examples, however, an example of an information distribution network which includes one or more of the computing devices discussed below, and which can be used in sending and receiving various messages and/or other data, will first be described. In addition, an example of a computing device and various hardware components that can be used in implementing one or more of the computing devices discussed herein will also be described.

Figure 1:
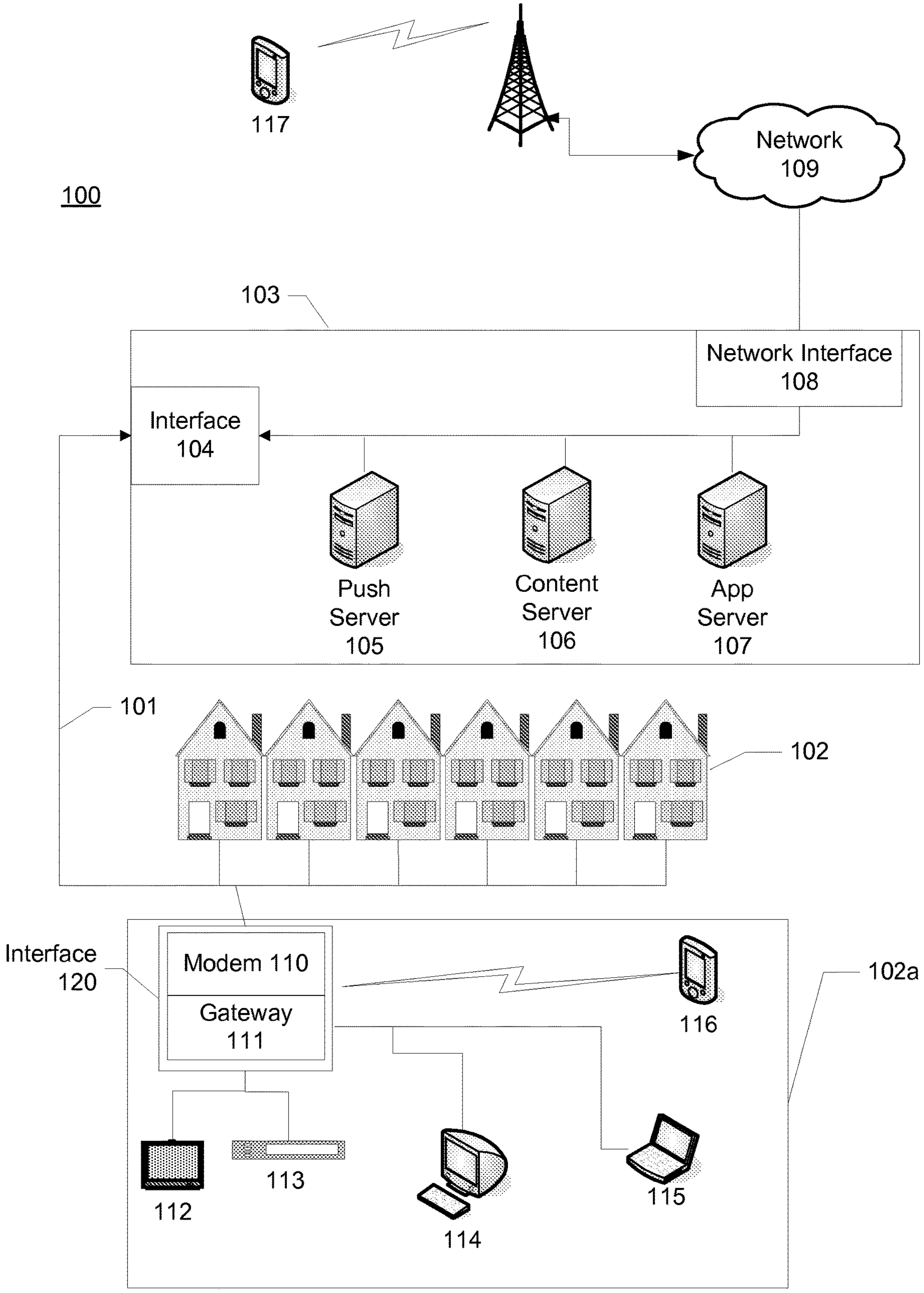
FIG. 1 illustrates an example network in which various features discussed herein may be implemented.

FIG. 1 illustrates an example information distribution network 100 on which many of the various features described herein may be implemented. Network 100 may be any type of information distribution network, such as a satellite network, a telephone network, a cellular network, a wireless network, and/or combinations thereof. For example, network 100 may be an optical fiber network, a coaxial cable network, or a hybrid fiber/coax (HFC) distribution network. Such a network 100 can use a series of interconnected communication links 101 (e.g., coaxial cables, optical fibers, wireless connections, etc.) to connect multiple premises 102 (e.g., businesses, homes, consumer dwellings, etc.) to a local office 103 (e.g., a headend, a central office, a processing facility, etc.). The local office 103 may transmit downstream information signals onto the links 101, and each premises 102 may have a receiver that can be used to receive and process those signals. The geographic location of the local office 103 can vary, and the local office 103 may be proximate to a user's neighborhood in some embodiments, while in other embodiments, the local office 103 may be located remotely at a centralized location. The various servers can be located anywhere, and their location might not be relevant to a user (e.g., the servers may be in the "cloud").

In some arrangements, there may be one link 101 originating from the local office 103, and it may be split a number of times to distribute the signal to various premises 102 in the vicinity (which may be many miles) of the local office 103. The links 101 may include components that are not illustrated, such as splitters, filters, amplifiers, etc., to help convey the signal clearly, but in general each split may introduce a bit of signal degradation. Some portions of the links 101 also may be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device that is configured to manage communications between devices on the network of links 101 and backend devices, such as servers 105, 106, and 107 (which are discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks, Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to communicate with other devices on the network, such as a cellular telephone network and its corresponding cell phones. Collectively, these networks 109 may be referred to herein as “the cloud” or “cloud architecture.”

As noted above, the local office 103 may include a variety of servers that may be configured to perform various functions. For example, the local office 103 may include a back office server 105. The back office server 105 may generate push notifications related to functions, such as billing, reporting, and subscriber management to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users, who may be, for example, in the premises 102 (e.g., homes). In some embodiments, the content server 106 may include software to validate (or initiate the validation of) user identities and entitlements, locate and retrieve (or initiate the location and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements located remotely in the network 109.

The local office 103 may also communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server 107 may be responsible for collecting television program listings information and generating a data download for electronic program guide listings. Another application server 107 may be responsible for monitoring user viewing habits and collecting that information for use in selecting advertisements. Another application server may be responsible for formatting and inserting advertisements in a video stream and/or content item being transmitted to the premises 102. As discussed below, still another application server 107 may be used to monitor and/or otherwise communicate with one or more security systems that may be deployed at various locations, such as the premises 102.

An example premises 102*a* may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the premises 102*a* to communicate with the local office 103 and other devices beyond the local office. The gateway 111 may be a set-top box (STB), digital video recorder (DVR), computer server, or any other desired computing device. The gateway 111 may also include local network interfaces (not shown) that can provide communication signals to other devices in the premises 102*a* (e.g., user devices), such as televisions 112, additional STBs 113, personal computers 114, laptop computers 115, wireless devices 116 (wireless laptops and networks, mobile phones, mobile televisions, tablet computers, PDA, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 4G, WiMAX, LTE, Bluetooth interfaces, and others. In some embodiments, the system may use ZigBee and Z-Wave compliant devices.

Figure 2:
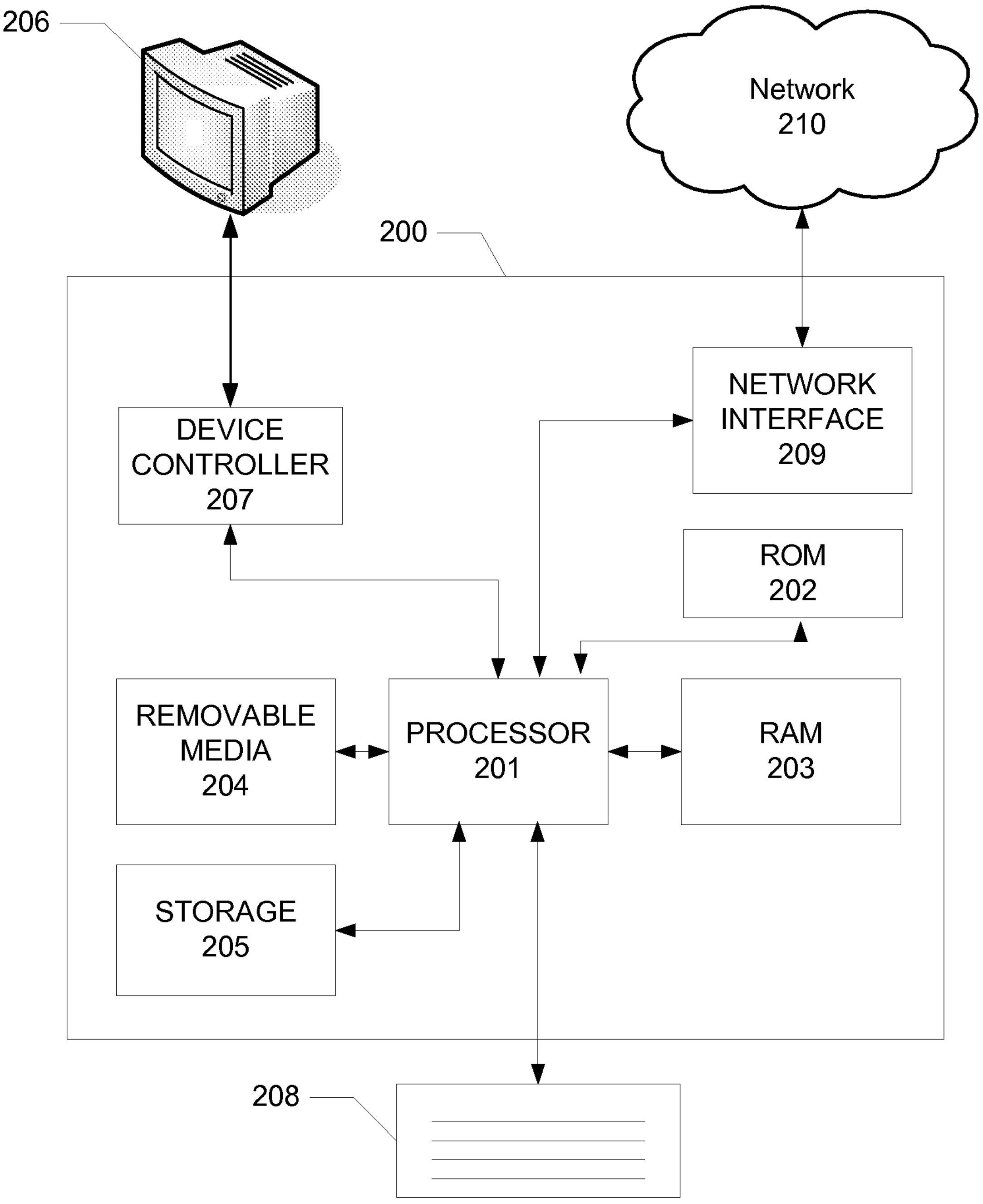
FIG. 2 illustrates an example computing device that may be used to implement any of the computing devices and servers discussed herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces 209, such as input/output circuits (such as a network card) to communicate with an external network 210. The network interface 209 may be a wired interface, wireless interface, or a combination of the two. In some embodiments, the interface 209 may include a modem (e.g., a cable modem), and network 210 may include the communication lines 101 discussed above, the external network 109, an in-home network, a provider’s wireless, coaxial, fiber, or hybrid fiber/coaxial distribution system (e.g., a DOCSIS network), or any other desired network.

FIG. 2 shows an example hardware configuration. Modifications may be made to add, remove, combine, divide, etc., components as desired. Additionally, the components illustrated may be implemented using basic computing devices and components, and the same components (e.g., processor 201, ROM 202, user input devices 208, etc.) may be used to implement any of the other computing devices and components described herein. For example, the various components herein may be implemented using computing devices having components such as a processor executing computer-executable instructions stored on a computer-readable medium (e.g., storage 205), as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media, such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents, such as integrated circuits, field programmable gate arrays (FPGAs), and the like. Particular data structures may be used to more effectively implement one or more aspects of the invention, and such data structures are contemplated as being within the scope of computer executable instructions and computer-usable data described herein.

Having described an example of an information distribution network and an example of a computing device that may be used in implementing various aspects of the disclosure, several examples illustrating how a central server computer can process messages received from a security console, such as a home security console, as well as how a security console can generate and send these messages, will now be described in greater detail.

Figure 3:
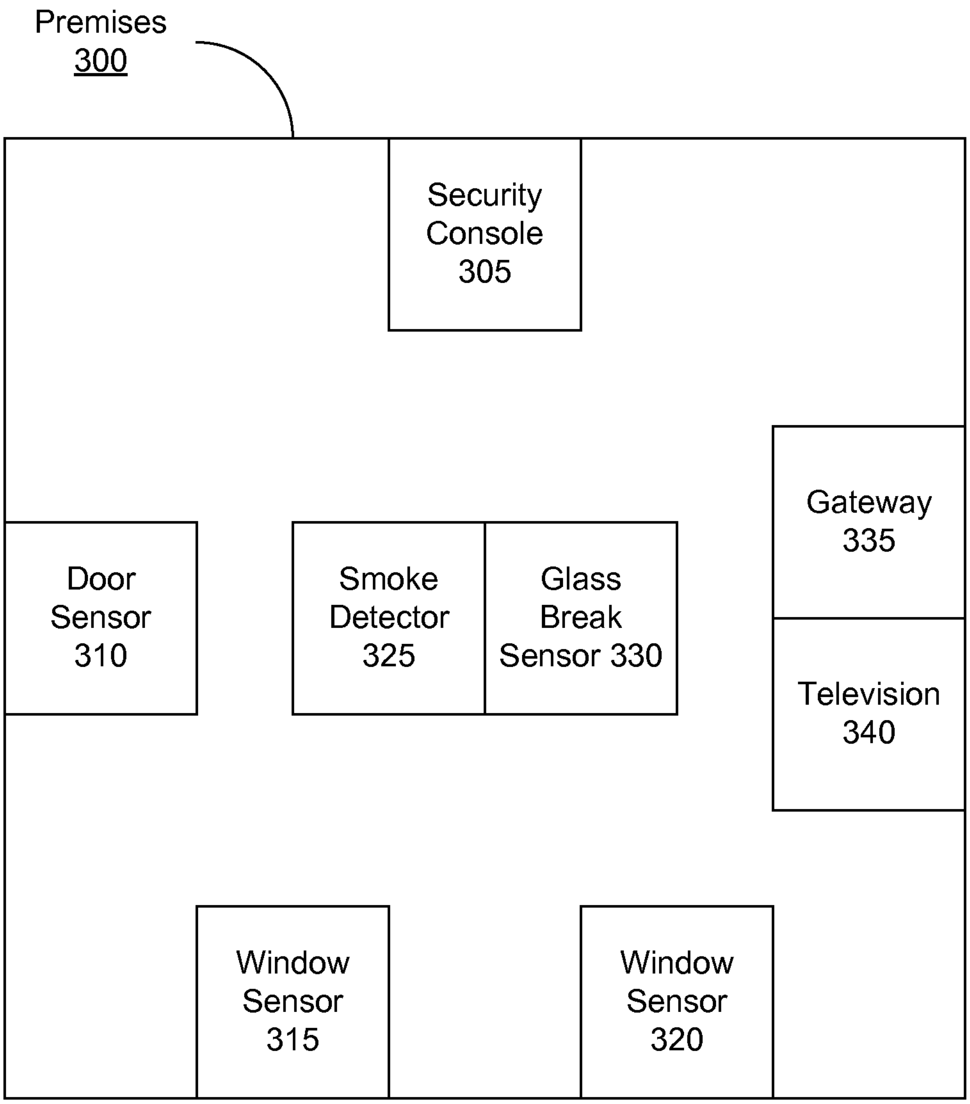
FIG. 3 illustrates an example premises at which a security console may be deployed.

FIG. 3 illustrates an example premises 300 that includes a home security system. As seen in FIG. 3, the home security system deployed at premises 300 may include a security console 305 and a number of sensors that can be configured to detect various occurrences and/or other changes in state(s) at premises 300. For example, the home security system deployed at premises 300 may include a door sensor 310 that is configured to detect whether a door at premises 300 is open or closed. In addition, the security system deployed at premises 300 may include a number of window sensors, such as window sensor 315 and window sensor 320, that are each configured to detect whether a particular window is open or closed. The home security system deployed at premises 300 also may include a smoke detector 325 that is configured to detect whether smoke is present at premises 300, and further may include a glass break sensor 330 that is configured to detect the sound associated with a window or other glass object breaking. Any and/or all of these sensors may be communicatively coupled via one or more wired and/or wireless connections to home security console 305, which may send and/or receive signals to and/or from the various sensors. In addition, by analyzing signals received from the various sensors, home security console 305 may be able to determine whether one or more alert criteria are met, and accordingly, whether an alarm should be sounded and/or whether other alert actions should be taken. Additionally, while FIG. 3 shows a particular number and configuration of sensors which may be included in a security system deployed at a premises in one embodiment, any number of sensors, as well as any number of home security consoles and/or different types of sensors, may be included in a home security system in other embodiments.

In addition to including a security console, such as a home security console, and a number of sensors, premises 300 also may include a gateway 335 and a television 340. In some embodiments, gateway 335 may implement one or more aspects of the gateway interface device 111, which was discussed above with respect to FIG. 1. This may, for instance, include receiving and/or decoding content via an information distribution network, as well as displaying and/or playing back such content on television 340. In some additional and/or alternative embodiments, gateway 335 and home security console 305 may be implemented in a single device that, for example, is configured to both monitor the various sensors that are installed at premises 300 and facilitate electronic communications (e.g., with a local office, such as local office 103, via one or more communication networks, such as network 100, etc.).

During its typical course of operation, the security system deployed at premises 300 may monitor signals received from the various sensors located at the premises, and also may send heartbeat messages to one or more server computers (e.g., to indicate that the system is functioning properly). In configurations where the security system deployed at premises 300 is monitored by a central monitoring service, the central monitoring service may use the heartbeat messages received from the security system, as well as other signals that may be received from the security system, to monitor the state of premises 300. For example, based on these messages and/or these signals, the central monitoring service may be able to determine whether an alarm or other alert has been triggered at premises 300 and/or whether other conditions have arisen. In arrangements where the security system deployed at premises 300 is not monitored by a central monitoring service, the security system may nevertheless send one or more heartbeat messages to one or more central server computers (e.g., simply to indicate that the security system is present at premises 300 and functioning properly).

As discussed above, certain embodiments discussed herein utilize these heartbeat messages to provide enhanced functionality to a user of such a security system, regardless of whether the security system is monitored or unmonitored by a central monitoring service. Accordingly, the security system deployed at premises 300 may, in some embodiments, embed additional information into one or more heartbeat messages, which the security system may send to the one or more central servers, such as an application server 107 at a central office, for instance. In one or more arrangements, this additional information may define one or more alert messages to be sent to other devices and/or users, and this additional information may cause such alert message(s) to be sent by the one or more central servers to these other devices and/or users. When the one or more central servers receive the heartbeat message(s) from the security system, the central server(s) may, for example, process and/or decode the additional information included in the heartbeat message(s) and subsequently send alert messages to other devices and/or users based on the contents of the additional information.

In some embodiments, before sending the one or more alert messages, the one or more central servers may first identify the other devices and/or users that are located near the location of the security system (e.g., located within a predetermined distance of the location of the security system) or the other devices and/or users that may be grouped together with the security system (e.g., based on a security-related consideration). Then, the one or more central servers may generate the alert messages, based on the additional information that was included in the heartbeat message(s) received from the security system, and send the alert messages to the devices and/or users that are identified as being near the location of the security system. In some instances, a group of devices may be grouped together based on a security-related consideration, such as geographical considerations and/or other types of considerations. For example, a group of devices may be grouped together based on the devices (and/or their respective premises and/or users) having shared access to common emergency services, by dwelling type (e.g., based on the devices being deployed and/or otherwise used at a bungalow, townhouse, apartment and/or apartment building, condominium and/or condominium building, office and/or office building, etc.), by street accessibility, etc. In these ways, relevant information about local alerts can be sent to (and received by) entities and devices that are located in the vicinity of a home security system that is in an alarm state or has otherwise generated some kind of alert. An example of how this information can be sent to such entities and devices will now be discussed with respect to FIG. 4.

Figure 4:
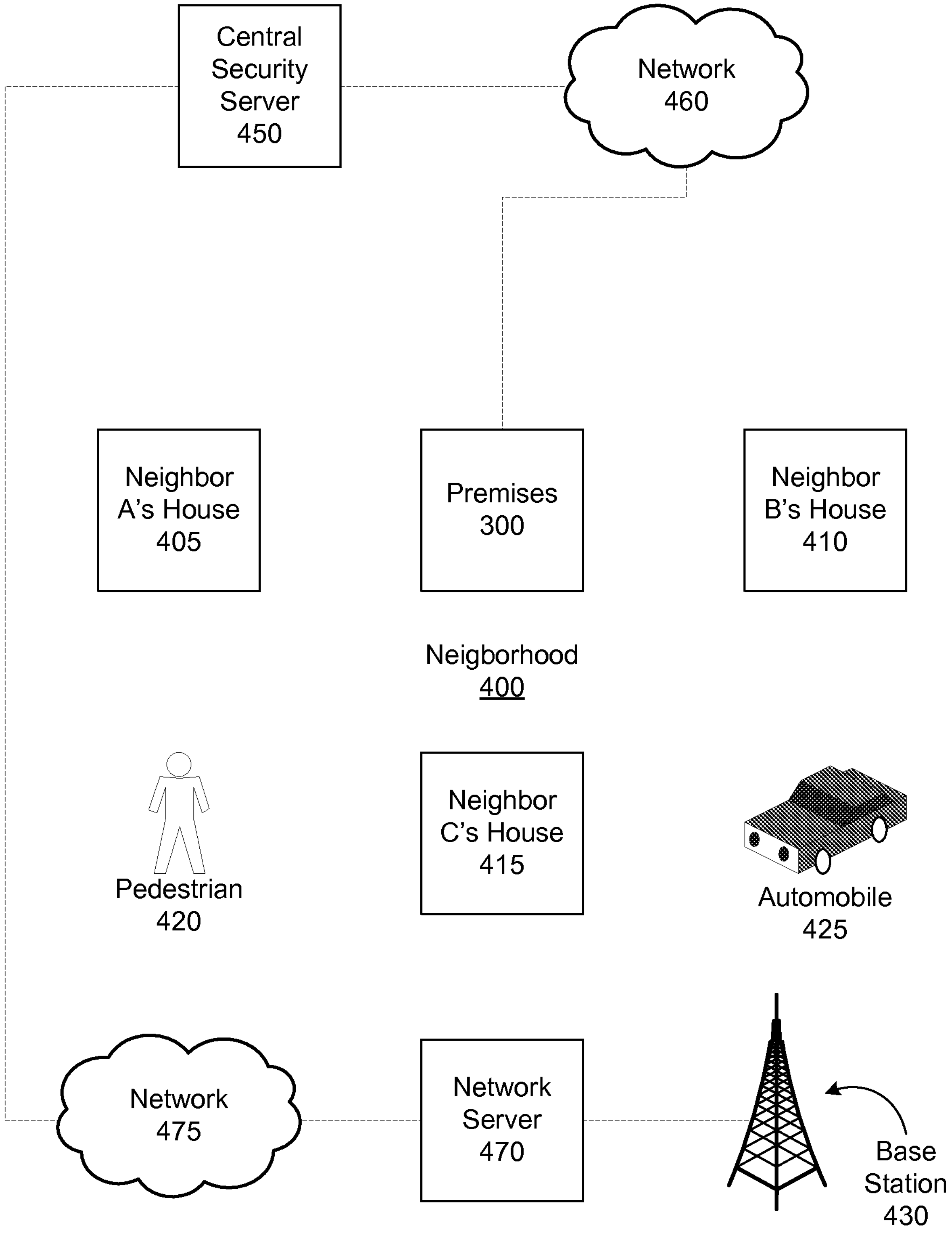
FIG. 4 illustrates a view of a neighborhood in which the example premises may be situated.

In particular, FIG. 4 illustrates a view of a neighborhood in which the example premises 300 may be situated. As seen in FIG. 4, in addition to including premises 300, neighborhood 400 also may include several neighboring houses 405, 410, and 415, as well as a pedestrian 420, an automobile 425, and a cellular base station 430. Each of the neighboring houses 405, 410, and 415 may be equipped with its own security system, and one or more of these security systems may communicate with the same central server as the security system included in premises 300. In addition, pedestrian 420 and automobile 425 may each have a mobile device which may send and receive wireless signals via a wireless network provided by cellular base station 430.

As discussed in the examples above, when an alarm is triggered at premises 300, the security console included in the security system can generate and insert additional data into its heartbeat messages to reflect the fact that the security alarm has been triggered. Then, upon receiving the heartbeat messages from the security console, a central server 450 can decode this data, determine if devices are located nearby, and then notify nearby devices, such as the security consoles located in the nearby houses 405, 410, and 415 and/or the mobile devices associated with pedestrian 420 and automobile 425. In some arrangements, this central server 450 may be implemented as or incorporated into application server 107, which was discussed above with respect to FIG. 1. In addition, the central server 450 may communicate with the security system installed at premises 300 via a network 460, which may incorporate one or more aspects of information distribution network 100.

Referring again to FIG. 4, once the central server 450 has determined that nearby devices need to be notified of an alert received through the heartbeat messages of a security console, such as a home security console, the central server 450 may identify the devices that are in the vicinity of the security console. Any desirable radius may be used in defining what constitutes the vicinity of the security console (e.g., within one-half miles of the security console and/or the premises where the security console is installed, within one mile, within two miles, within five miles, etc.), and this identification process can be carried out in different ways. For example, some of the devices that are located within the vicinity of the security console may be registered with the central server 450 and/or may include specific software that periodically checks in with the central server 450. In some cases, this software may be an application or "app" installed on a mobile device (e.g., one of the mobile devices associated with pedestrian 420 or automobile 425) and may cause the mobile device to emulate a security console, such as a home security console. This emulation may, for instance, enable a user of the software to remotely control a home security system, such as one of the home security systems installed at one of the houses illustrated in FIG. 4, and may cause the mobile device to send heartbeat messages to the central server 450, similar to how a security console may send such messages to the central server 450. Additionally, the heartbeat messages sent by the mobile device to the central server 450 may include additional location information that, for instance, specifies the current position of the mobile device, so as to enable the central server 450 to determine and/or evaluate the mobile device's location. By providing emulation software on a mobile device, greater convenience can be provided to owners and/or other users of home security systems, as these owners and/or users may be able to interact with and/or control their home security system whether or not they are physically located in their home (or in whatever other premises the security system may be monitoring).

For other devices which may be registered with the central server 450, the central server 450 can maintain registration information that specifies a relatively fixed position for each of the registered devices. For instance, a security system installed at neighboring house 405 may be registered with the central server 450, such that the central server 450 maintains, stores, and/or is otherwise able to access position information that specifies the location of the security system installed at the neighboring house 405. As an example, this position information may include the street address of the house 405 at which the security system is installed.

In some instances, some of the devices that are located within the vicinity of the security console might not be registered with the central server 450 and might not include such emulation software. In these instances, the central server 450 may still be able to identify these devices using other techniques. For example, pedestrian 420 may be visiting neighborhood 400 but might not have registered his or her mobile device with the central server 450 or have the emulation software discussed above installed on his or her mobile device. Nevertheless, the central server may still be able to identify the pedestrian's mobile device as being within the vicinity of the security console at premises 300 based on the pedestrian's mobile device being connected to base station 430, which the security console at premises 300 may also be connected to and/or otherwise receive wireless signals from. In order to identify the pedestrian's mobile device in this way, the central server 450 first may interrogate and/or otherwise communicate with base station 430 to determine what devices are connected to the base station, and subsequently may send messages to the devices that are identified through the interrogation process. In still other instances, even though a particular mobile device might not be registered with the central server 450 and might not include the emulation software discussed above, a provider (e.g., an entity operating one or more of the central server 450, the base station 430, the security console at premises 300, etc.) may have other information about various devices that are used by various users, and this information may be used to identify, establish a connection with, and/or communicate with such a device.

In some arrangements, the central server 450 may be able to communicate with base station 430 and/or other base stations that may be within the vicinity of premises 300 by utilizing a cellular interface provided by the security console at premises 300. For example, the security console at premises 300 may include one or more transceivers and/or other circuitry that enables the security console to provide cellular communication functionalities, and the central server 450 may utilize these functionalities to communicate, via its connection to the security console at premises 300, with base station 430. In other arrangements, however, the central server 450 might not be able to communicate with base station 430 and/or other base stations via a cellular interface (e.g., if the security console at premises 300 does not include such a cellular interface, if cellular signals are unavailable, etc.). In these arrangements, the security console at premises 300 and the central server 450 may communicate on a different network than the mobile devices that are located in neighborhood 400. For example, the security console at premises 300 and the central server 450 may communicate via a terrestrial network (e.g., a hybrid fiber-coaxial network), while the mobile devices that are located in neighborhood 400 may communicate via a wireless network (e.g., a cellular network). In these instances, the central server 450 and/or the security console at premises 300 may nevertheless be able to exchange data with one or more base stations, including base station 430, by communicating over one or more other networks, such as the internet. For example, the central server 450 may, in some instances, be able to interrogate and/or otherwise communicate with one or more base stations, such as base station 430, by communicating with one or more network servers that are connected to the one or more base stations (e.g., by communicating with network server 470 via network 475). Such a network server may, for instance, be operated by the same cellular service provider as the one or more base stations to which it is connected.

In some instances, including instances in which the central server 450 and/or the security console at premises 300 are not able to communicate directly with a base station near premises 300 (e.g., via a cellular interface included in the security console), it may be desirable to determine the approximate location of the mobile devices that are connected to the base station before sending one or more alert messages. For example, the central server 450 may be configured to determine which, if any, of the mobile devices connected to the base station are actually close enough to premises 300 to warrant receiving an alert message about an event that occurred at the premises 300, rather than sending alert messages to all of the mobile devices that are connected to the base station. One way that the approximate location of such a mobile device may be determined is using Global Positioning System (GPS) functionalities built into the mobile device. For instance, the mobile device may use built-in GPS functionalities to determine geographic coordinates indicative of its current position, and subsequently may report these geographic coordinates to the central server 450 (e.g., in response to an inquiry that the central server 450 may send to the mobile device). Additionally or alternatively, multi-lateration techniques, such as triangulation (also known as "cell tower triangulation") or Advanced Forward Link Trilateration (AFLT), also may be used instead of and/or in addition to GPS-based techniques to determine the position of a mobile device. Based on the position information that may be obtained from various mobile devices, the central server 450 may determine that some mobile devices connected to a particular base station (e.g., base station 430) are close to premises 300 and should receive a particular alert message, and/or that other mobile devices connected to the base station are not close to premises 300 and accordingly should not receive a particular alert message. As discussed above, whether or not a particular device is close to premises 300 may depend on whether or not the particular device is located within and/or determined to be located within a predetermined distance of the premises 300.

Once the central server 450 has identified one or more devices that are close to the security system installed at premises 300 using one or more of the techniques discussed above, for instance, the central server 450 may proceed with sending alert messages to these nearby devices, based on the additional information that was embedded in the heartbeat messages received from the security console at premises 300. These alert messages can be sent to the nearby devices by the central server 450 in any desirable way. For example, these messages may be sent as text messages, email messages, or other electronic messages to the nearby devices.

In addition, the content included in the alert messages sent by the central server 450 to these other devices can be based on the information that was included in the heartbeat messages sent by the security console, as well as on other information that may be available to the central server 450. For example, in a situation in which a burglar alarm has been triggered at premises 300, the heartbeat messages received from the security console at premises 300 may specify what time the burglar alarm was triggered, what particular sensors were tripped (e.g., the door sensor, the glass break sensor, etc.), and may also include additional data that may have been captured and/or detected at the time when the alarm was tripped. For instance, if the security system installed at premises 300 includes one or more cameras, then the security system may have captured additional data in the form of pictures and/or video of the burglars who broke into the premises 300 and caused the alarm to trip. In some instances, this additional data (which may have been embedded in the heartbeat messages received from the security console at premises 300, or which may be otherwise available to the central server 450, e.g., if such pictures and/or video are received from another source system) can be sent in the alert messages to the other devices that are nearby premises 300, so as to better notify the users of these devices of the nature of the burglary.

While the examples discussed above involve sending heartbeat messages with additional data reflecting a situation in which a burglar alarm has been tripped at premises 300, similar data may likewise be embedded into the heartbeat messages of a security system in other situations in which it may be desirable to notify other devices and users in a localized area of the occurrence of a particular event. For example, one resident of the houses included in neighborhood 400 may be an elderly person, who, using the functionalities described herein, may be able to utilize his or her home security system to request the assistance of neighbors in driving to a doctor's appointment or getting their car dug out of the snow. In this example, the elderly person may be able to provide user input to their home security system (e.g., through one or more user interfaces that can, for instance, be displayed on their television, personal computer, mobile device, etc.) to generate the request for assistance, and the security console of the security system may accordingly embed additional data reflecting this request into its heartbeat messages. Upon receiving the heartbeat messages that include this additional data, the central server 450 may process and decode these messages, determine what devices are present in neighborhood 400, and send alert messages to these devices, as in the examples discussed above, where the alert messages include, in this case, the elderly person's request for assistance.

As another example, a user of a home security system may wish to notify neighbors that his or her dog has run away from home, e.g., in hopes of the dog being returned. As in the other examples discussed above, the user may be able to create an alert message using their home security system that can be transmitted to the central security server 450 via one or more heartbeat messages. Then, the central server 450 can send the alert message, which was received via the heartbeat messages sent from the home security system, on to the mobile devices, security systems, and other devices of nearby friends and neighbors in neighborhood 400.

In some embodiments, different alert messages may be sent (e.g., by the central server 450) to different devices and/or users based on the same alert content that is received from a particular home security console. For instance, the particular alert message that is sent to a particular device and/or user may, in some embodiments, depend on demographic information associated with the user of the device. For example, depending on demographic information that is available to central server 450 about one or more of the users of the recipient devices in the vicinity of premises 300, the central server 450 may determine that one alert message with a certain type of content should be sent to a first subset of recipients, while another alert message with a different type of content should be sent to a second subset of recipients. Such demographic information may, for instance, be obtained by the central server 450 during a device registration process performed at each of the mobile devices.

As an example, if demographic information for a first subset of users indicates that their preferred language is English, and demographic information for a second subset of users indicates that their preferred language is Spanish, then the central server 450 may determine to send an alert message in English to the first subset of users and a different alert message in Spanish to the second subset of users. In this example, prior to sending the alert message in Spanish, the central server 450 also may translate English alert content into Spanish to facilitate sending the alert message in Spanish. In other instances, other languages may be similarly employed by central server 450, along with similar translation techniques.

In some instances, the central server 450 may determine, based on demographic information, not to send an alert message to a particular recipient device, even though the recipient device may be in the vicinity of the premises 300. For example, in a situation in which an elderly person requests assistance from his or her neighbors, the central server 450 may determine, based on demographic information for the one or more recipient users and/or corresponding devices, not to send an alert message regarding this request for assistance to other elderly persons or minors, who might not be able to provide appropriate assistance to the elderly person.

In one or more arrangements, once an alert message is received at a recipient device (e.g., from central server 450 based on a determination that the recipient device is close to the security console that generated the alert), the alert message can be displayed to a user of the recipient device. Several examples of how such an alert message can be displayed are illustrated in FIGS. 5 and 6.

Figure 5:
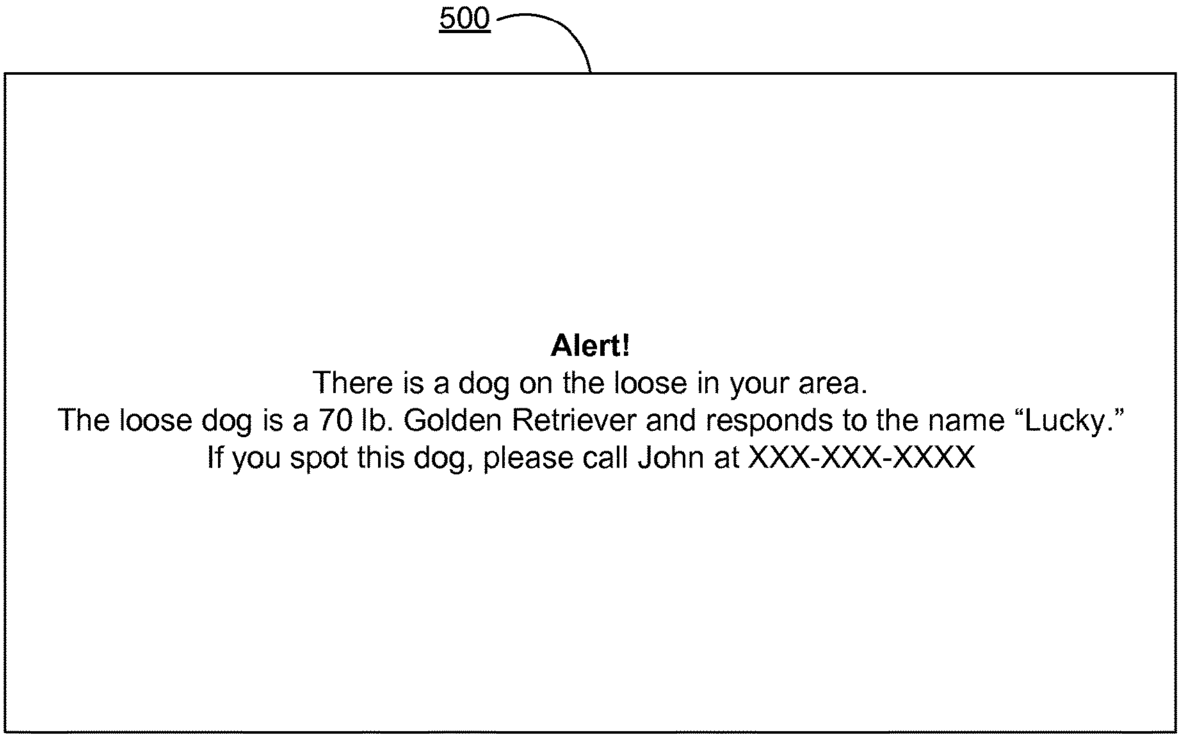
FIG. 5 illustrates an example user interface screen that includes an alert message.
Figure 6:
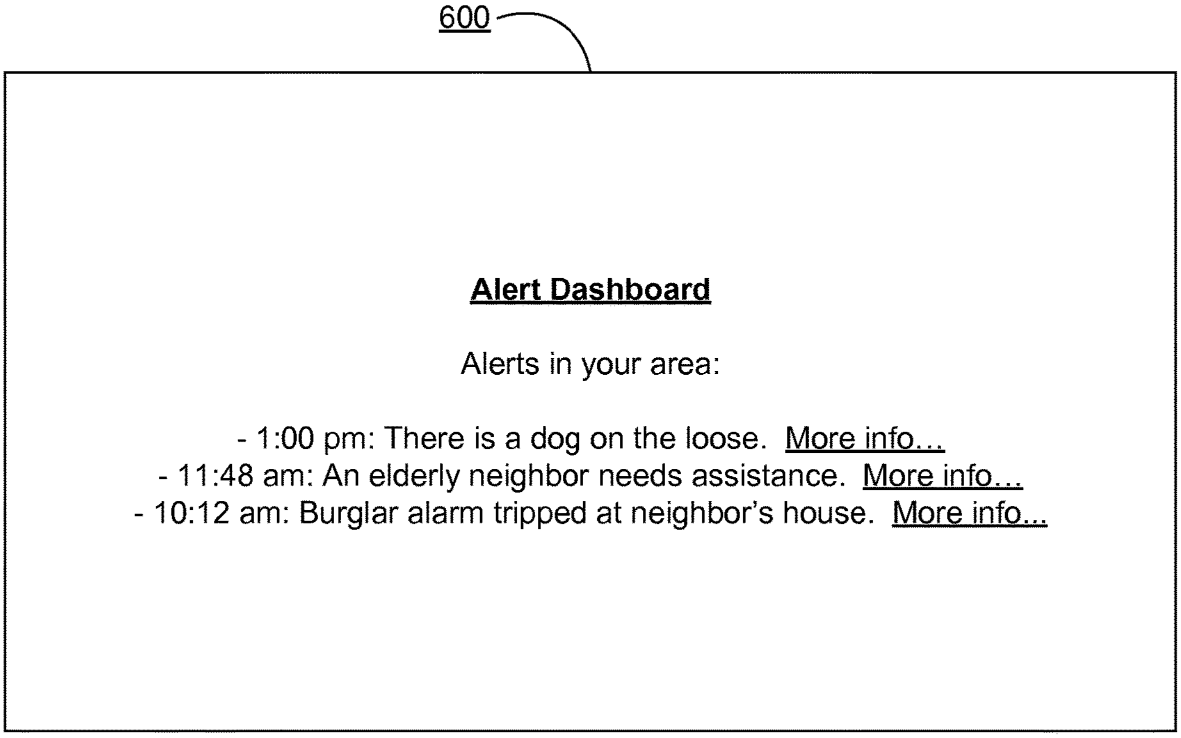
FIG. 6 illustrates an example user interface screen that includes an alert message dashboard.

For instance, in FIG. 5, an example user interface screen 500 that includes an alert message is illustrated. As seen in FIG. 5, the alert message may be displayed in a user interface provided on and/or by any type of computing device (e.g., a smart phone, a tablet computer, a mobile device, a desktop computer, a set-top box coupled to a television, etc.). In addition, the alert message displayed in the user interface can include any type of desired content (e.g., text, audio, video, image, etc.). For instance, in the example illustrated in FIG. 5, an alert that includes text content about a missing dog, as discussed in the examples above, is displayed.

In addition to being displayed on a user interface screen, an alert message may additionally or alternatively be played back as audio to one or more recipients using a text-to-speech capability included in a recipient device. For example, a user device may utilize such a text-to-speech capability to read or otherwise announce a localized alert when an alert message is received (e.g., from central server 450).

In some additional and/or alternative arrangements, a user interface that includes information about a number of different alert messages may be displayed and/or otherwise provided to a user of a computing device. For instance, FIG. 6, which depicts a user interface 600 that includes an alert message dashboard, illustrates an example of such a user interface. In particular, as seen in FIG. 6, a user interface may displayed (e.g., by any of the computing devices discussed above) that includes information about a number of different alert messages that have been received by the device. Such information may, for instance, include the time at which each message was received, a summary and/or preview of the content of each message, and a user-selectable link to obtain additional and/or more detailed information associated with the message. For example, upon receiving a user selection of a link associated with a burglar alarm alert message listed in user interface 600, the computing device may display a picture of a suspect for the burglary that triggered the alarm.

In some instances, other information, such as weather forecast information, weather alerts, fire alerts, etc., may be similarly displayed in the alert dashboard along with one or more other alert messages. For example, if a weather alert is in effect (e.g., for a hurricane or a blizzard), an agency (e.g., a local government, a weather service, etc.) may be able to utilize various aspects of the systems discussed above in order to send alert messages to devices in a particular area, and these messages may be aggregated and displayed by a computing device in the alert message dashboard along with other alert messages, such as the alert messages illustrated in FIG. 6.

As discussed above, some of the features and functionalities associated with some embodiments can be provided by, and/or as a result of, processing that is performed at and/or by one or more central servers, which may, for instance, receive heartbeat messages and/or other information from one or more home security consoles and/or other components of a security system. Some of the steps that may be performed by such a server in executing this processing will now be illustrated through a discussion of the flowchart illustrated in FIG. 7.

Figure 7:
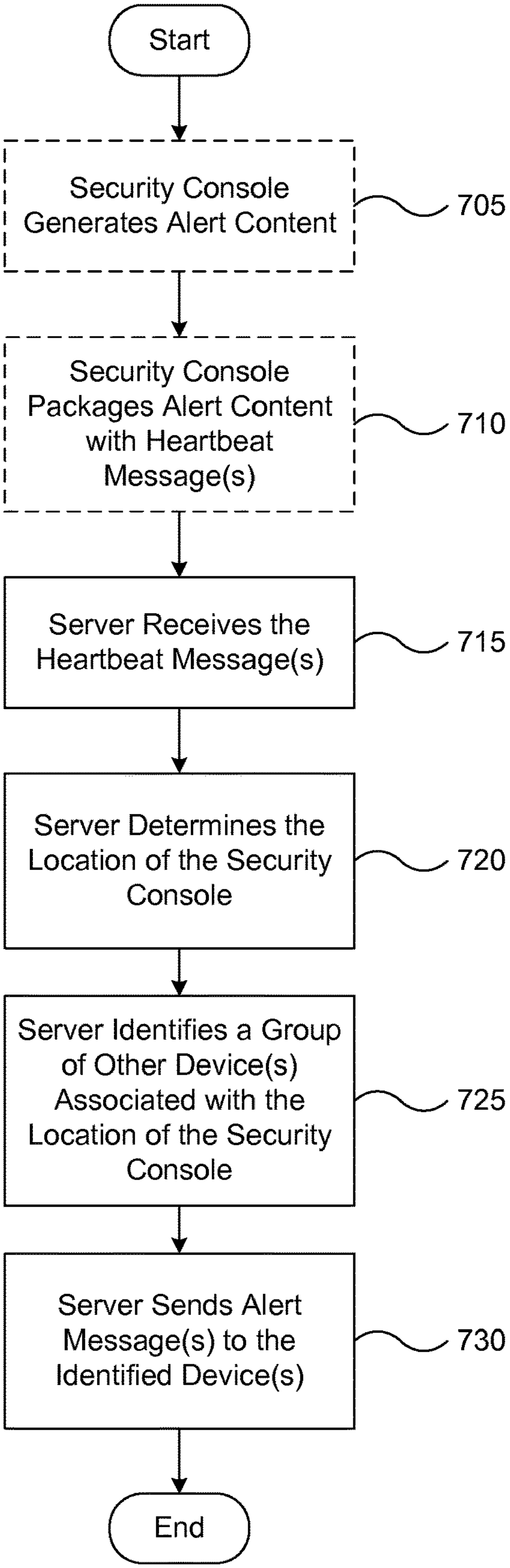
FIG. 7 illustrates a flowchart depicting an example method of processing messages received from a security console, such as a home security console.

More particularly, FIG. 7 illustrates a flowchart that depicts an example method of processing messages received from a security console, such as a home security console. As discussed above, in some embodiments, one or more steps of the method illustrated in FIG. 7 may be performed by a server (e.g., application server 107 of FIG. 1, central security server 450 of FIG. 4, etc.), which may be configured to receive and/or process heartbeat messages and/or other information received from a security console, such as a home security console, and/or other elements of a security system. In some additional and/or alternative embodiments, one or more steps of the method illustrated in FIG. 7 may be embodied in computer-executable instructions which are stored in a transitory or non-transitory computer-readable medium, and which, when executed by one or more computing devices, cause such computing devices to perform one or more steps of the method.

As seen in FIG. 7, the method may be initiated in step 705, in which a security console may generate alert content, such as one or more alert messages. The alert content may, for instance, be generated by a security console, such as a home security console, or any other security-associated device to alert other devices (and/or the users of such devices) or a monitoring facility of particular conditions at the premises where the security console is installed. For example, in some instances, alert messages may be generated based on the detection, by the security system, of one or more alert criteria being met. Such alert criteria may, for instance, be a window or door being opened, a motion sensor being tripped, and/or a glass break sensor being tripped while the security system is in an "armed" state. In other instances, alert content, including alert messages, may be generated by the security console based on user input received by the security console. For instance, an alert message may be generated as a result of a user creating and/or composing a message to neighbors and/or friends about a lost dog or a request for assistance, as in the examples discussed above.

In step 710, the security console may optionally package or otherwise combine the alert content generated in step 705 with one or more heartbeat messages. In some instances, packaging the alert content with the one or more heartbeat messages may include formulating one or more typical or specific heartbeat messages, and subsequently adding and/or modifying parts of these heartbeat messages so as to embed the additional data that defines the previously-generated alert content.

For example, a security console, such as a home security console, may, in a typical configuration, periodically send a heartbeat message to a monitoring station and/or a monitoring server (e.g., application server 107 of FIG. 1, central security server 450 of FIG. 4, etc.), which in turn may be configured to send an acknowledgement message back to the security console. In some arrangements, the heartbeat message may be sent via a broadband connection (e.g., using TCP/IP) and/or via a cellular connection (e.g., using UDP). In instances in which one network interface is unavailable, the security console may utilize another interface to send the heartbeat message. For example, if a broadband connection is unavailable, the security console may use a cellular connection as a backup for sending one or more heartbeat messages.

In one or more arrangements, the security console may generate the one or more heartbeat messages using Extensible Messaging and Presence Protocol (XMPP). Additional data corresponding to the alert content may, for instance, be embedded into such a heartbeat message by the security console in addition to the other content that may be typically included in the heartbeat message, which may include an address or device identifier of the security console and/or a status identifier associated with a current operational state of the security console. The frequency at which the security console sends the one or more heartbeat messages may be configurable and, in some instances, may depend on a level of service provided to and/or desired by the user of the security console. For example, in some instances, a security console, such as a home security console, may be configured to send a heartbeat message every 600 seconds, while in other instances, the security console may be configured to send a heartbeat message every 1200 seconds or every 1800 seconds. In some arrangements, the security console may be configured to send quick heartbeat message(s) instead of and/or in addition to regular heartbeat message(s). The quick heartbeat message(s) may be sent at a higher frequency than the regular heartbeat message(s), such as every 60 seconds or every 120 seconds, and, like the regular heartbeat message(s), may be used to send alert content from a security console, such as a home security console, to a central server, as discussed herein. While these frequencies are discussed here as examples, one or more heartbeat messages may, in other arrangements, be sent by a security console at higher or lower frequencies, as may be desired.

As the alert content is packaged with the one or more heartbeat messages, the security console may send the one or more heartbeat messages to a central server. In particular, and as described in some of the examples discussed above, the security console may, in some embodiments, be connected to, integrated into, and/or otherwise incorporated in a gateway device, such as gateway 111, that is configured to be connected to a hybrid fiber-coaxial network, such as information distribution network 100. In addition, the security console may be configured to send the one or more heartbeat messages to the central server via such a network. Additionally or alternatively, the central server, which may be configured to receive these heartbeat messages, may be implemented as and/or included in one or more of the server computing devices discussed above, such as the application server 107.

In step 715, the central server may receive the one or more heartbeat messages from the security console. As discussed above, the heartbeat messages may include additional data which defines alert content, including one or more alert messages, that is to be sent to other devices (and/or the users of such devices) which are in the vicinity of the security console. In some embodiments, in addition to defining the alert messages to be sent to the other devices, the additional data and/or the alert content included in the heartbeat messages may itself cause the central server to send one or more alert messages to the devices and/or users that are located in the vicinity of the security console. For example, and as discussed in greater detail below, as a result of receiving the alert content via one or more heartbeat messages in step 715, the central server may, in some embodiments, generate and send one or more alert messages to other devices based on the received alert content, regardless of whether the security console that generated the alert content in step 705 requested or intended such alert content to be sent to other devices. In some instances, in step 715, the central server also may receive additional and/or alternative information from the security console instead of and/or in addition to the heartbeat messages.

In step 720, the central server may determine the location of the security console. As described below, this may enable the central server to determine what other devices may be located near the security console. In some instances, the central server may determine the location of the security console based on database records and/or other information that is stored by the server or is otherwise accessible to the server. Such records and/or other information about the location of the security console may, for instance, be available to the central server if the security console currently has or previously had a subscription to a monitoring service that is provided using the central server. In other instances, the central server may determine the location of the security console by extracting geolocation information the one or more heartbeat messages that are received from the security console. For example, in some arrangements, the heartbeat messages received from the security console in step 715 may include geolocation information, such as a street address, geographic coordinates, or other information, that specifies the location of the security console.

Subsequently, in step 725, the central server may identify one or more other devices that are associated with the security console. The one or more other devices (e.g., a group) may be located within a predetermined distance of the location of the security console. These other devices may, for instance, include other home security consoles (e.g., which may be part of other security systems installed at other houses) and/or other devices, such as cellular phones, tablet computers, other mobile devices, desktop computers, set-top boxes, and/or other computing devices. As discussed above, the central server may identify these other devices as being located within the predetermined distance of the location of the security console based on information that the central server may store or access that describes the location of these other devices. For example, the central server may determine that other home security consoles are located within a predetermined distance of the location of the security console that generated the alert content in step 705 based on the database records discussed above and/or based on registration information for these other consoles and/or devices that may have been previously received by the central server. Additionally or alternatively, the other security consoles may be grouped (e.g., by the central server) based on these other security consoles being deployed in locations that have shared access to certain emergency services, particular roads and/or highways, etc. In some arrangements, the central server may additionally or alternatively identify one or more cellular-enabled mobile devices (e.g., cellular-enabled smart phones, tablet computers, etc.) that are located within a predetermined distance of the security console by communicating with and/or interrogating a cellular base station close to the security console that generated the alert content. As discussed above, by communicating with and/or interrogating a cellular base station in this way, the central server may be able to determine what devices are connected to the base station and obtain enough information about these devices to send alert messages to them.

In step 730, the central server may send one or more alert messages to the devices that were identified in step 725 as being near the location of the security console. The one or more alert messages sent to these devices may be based on the alert content and/or other additional information included in the heartbeat messages that the central server received from the security console. For example, in some instances, the central server may generate one or more alert messages based on the alert content and/or other additional information that was included in the heartbeat messages. This may, for instance, include reformatting the alert content that was originally generated by the security console prior to sending the alert messages to the identified devices. In other instances, the central server may send one or more alert messages to the devices without modifying the alert content received from the security console via the heartbeat messages.

In some embodiments, the central server may, in step 730, send one or more alert messages to at least one recipient device in response to receiving a heartbeat message from the at least one recipient device. For example, one of the devices identified as being near the location of the security console in step 725 may be a second security console that may also periodically send its own heartbeat messages to the central server. Upon receiving a heartbeat message from this second security console, the central server may send the one or more alert messages to the second security console, which can then display, to its own users, the alert content that was originally generated by the first home security console in step 705. Additionally or alternatively, the central server may, in some instances, send an acknowledgement message in response to receiving a heartbeat message from at least one recipient device, where the acknowledgement message includes the one or more alert messages.

After the central server sends the one or more alert messages in step 730, the method may end. Additionally or alternatively, in some embodiments, the method may continue to be executed in a loop. For example, the central server may, in some embodiments, continue to receive heartbeat messages and, when appropriate, generate and send alert messages, as in the examples discussed above.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. Any of the above described systems and methods or parts thereof may be combined with the other methods and systems or parts thereof described above. Any and/or all of the methods described herein may be embodied as computer-executable instructions stored on a computer-readable medium. In addition, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
receiving, by a computing device and from a monitoring system at a location, a message indicating that a security condition has occurred in proximity to the location;
determining, by the computing device and based on location information associated with the location, one or more wireless devices within a threshold distance of the location; and
sending, by the computing device and to a wireless device of the one or more wireless devices within the threshold distance of the location, an alert message based on the security condition.

2. The method of claim 1, wherein the message indicating that the security condition has occurred comprises one or more of an image or video associated with the security condition, and wherein the alert message comprises the one or more of the image or video.

3. The method of claim 1, wherein determining the one or more wireless devices comprises:
determining, based on at least one of the one or more wireless devices being in communication via a gateway device located within the threshold distance of the location, that the at least one wireless device is within the threshold distance of the location.

4. The method of claim 1, wherein sending the alert message comprises sending the alert message to the wireless device via a first protocol, the method further comprising:
sending the alert message to at least one other wireless device, of the one or more wireless devices, via a second protocol different from the first protocol.

5. The method of claim 1, wherein the one or more wireless devices comprise cellular devices, and
wherein the message received by the computing device from the monitoring system comprises a heartbeat message.

6. The method of claim 1, wherein determining the one or more wireless devices within the threshold distance of the location comprises determining whether a distance from the location to a cellular base station, in communication with at least one of the one or more wireless devices, is within the threshold distance of the location.

7. An apparatus comprising:
one or more processors;
memory storing executable instructions that, when executed by the one or more processors, cause the apparatus to:
receive, from a monitoring system at a location, a message indicating that a security condition has occurred in proximity to the location;
determine, based on location information associated with the location, one or more wireless devices within a threshold distance of the location; and
send, to a wireless device of the one or more wireless devices within the threshold distance of the location, an alert message based on the security condition.

8. The apparatus of claim 7, wherein the message indicating that the security condition has occurred comprises one or more of an image or video associated with the security condition, and
wherein the alert message comprises the one or more of the image or video.

9. The apparatus of claim 7, wherein the executable instructions, when executed by the one or more processors, cause the apparatus to:
determine the one or more wireless devices by determining, based on the location information associated with the location, at least one cellular device within the threshold distance of the location and at least one other device within the threshold distance of the location.

10. The apparatus of claim 7, wherein the executable instructions, when executed by the one or more processors, cause the apparatus to determine the one or more wireless devices by determining that at least one of the one or more wireless devices is in communication via a gateway device located within the threshold distance of the location.

11. The apparatus of claim 7, wherein the executable instructions, when executed by the one or more processors, cause the apparatus to:
send the alert message to the wireless device by sending the alert message via a first protocol; and
send the alert message to at least one other wireless device, of the one or more wireless devices, via a second protocol different from the first protocol.

12. The apparatus of claim 7, wherein the executable instructions, when executed by the one or more processors, cause the apparatus to:
determine the one or more wireless devices by determining, based on the location information associated with the location, one or more cellular devices within the threshold distance of the location.

13. The apparatus of claim 7,
wherein the one or more wireless devices comprise one or more cellular devices, and
wherein the executable instructions, when executed by the one or more processors, cause the apparatus to determine the one or more wireless devices by:
determining a cellular base station via which the one or more cellular devices are in communication; and
determining that a distance, from the cellular base station to the location, is within the threshold distance.

14. A system comprising:
a monitoring system at a location; and
a computing device comprising:
one or more processors;
memory storing executable instructions that, when executed by the one or more processors, cause the computing device to:
receive, from the monitoring system, a message indicating that a security condition has occurred in proximity to the location;
determine, based on location information associated with the location, one or more wireless devices within a threshold distance of the location; and
send, to a wireless device of the one or more wireless devices within the threshold distance of the location, an alert message based on the security condition.

15. The system of claim 14, wherein the message indicating that the security condition has occurred comprises one or more of an image or video associated with the security condition, and
wherein the alert message comprises the one or more of the image or video.

16. The system of claim 14, wherein the executable instructions, when executed by the one or more processors, cause the computing device to:
determine the one or more wireless devices by determining, based on the location information associated with the location, at least one cellular device within the threshold distance of the location and at least one other device within the threshold distance of the location.

17. The system of claim 14, wherein the executable instructions, when executed by the one or more processors, cause the computing device to:
determine the one or more wireless devices by determining that at least one of the one or more wireless devices is in communication via a gateway device located within the threshold distance of the location.

18. The system of claim 14, wherein the executable instructions, when executed by the one or more processors, cause the computing device to:
send the alert message to the wireless device by sending the alert message via a first protocol; and
send the alert message to at least one other wireless device, of the one or more wireless devices, via a second protocol different from the first protocol.

19. The system of claim 14, wherein the one or more wireless devices comprise one or more cellular devices, and
wherein the executable instructions, when executed by the one or more processors, cause the computing device to determine the one or more wireless devices by:
determining a cellular base station via which the one or more cellular devices are in communication; and
determining that a distance, from the cellular base station to the location, is within the threshold distance.

20. The method of claim 1, wherein determining the one or more wireless devices is further based on demographic data of one or more users of the one or more wireless devices and wherein the alert message based on the security condition comprises content based on demographic data of a user of the wireless device of the one or more wireless devices.

21. The method of claim 1, further comprising sending, to one or more second wireless devices that have access to an emergency service, an additional alert message.

22. The method of claim 1, wherein the message comprises an indication of one or more of:
output of a door sensor;
output of a window sensor;

output of a smoke detector;
output of a glass-break sensor;
an image or video associated with output of one or more sensors at the location;
triggering of an alarm at the location;
user input to the monitoring system at the location; or
a request for assistance.

* * * * *